Feb. 25, 1964                 M. SETRIN                 3,122,737
APPARATUS FOR SUPPRESSING SIDE-LOBE INTERROGATIONS
IN TRANSPONDER BEACON SYSTEMS
Filed May 17, 1960                                         4 Sheets—Sheet 1
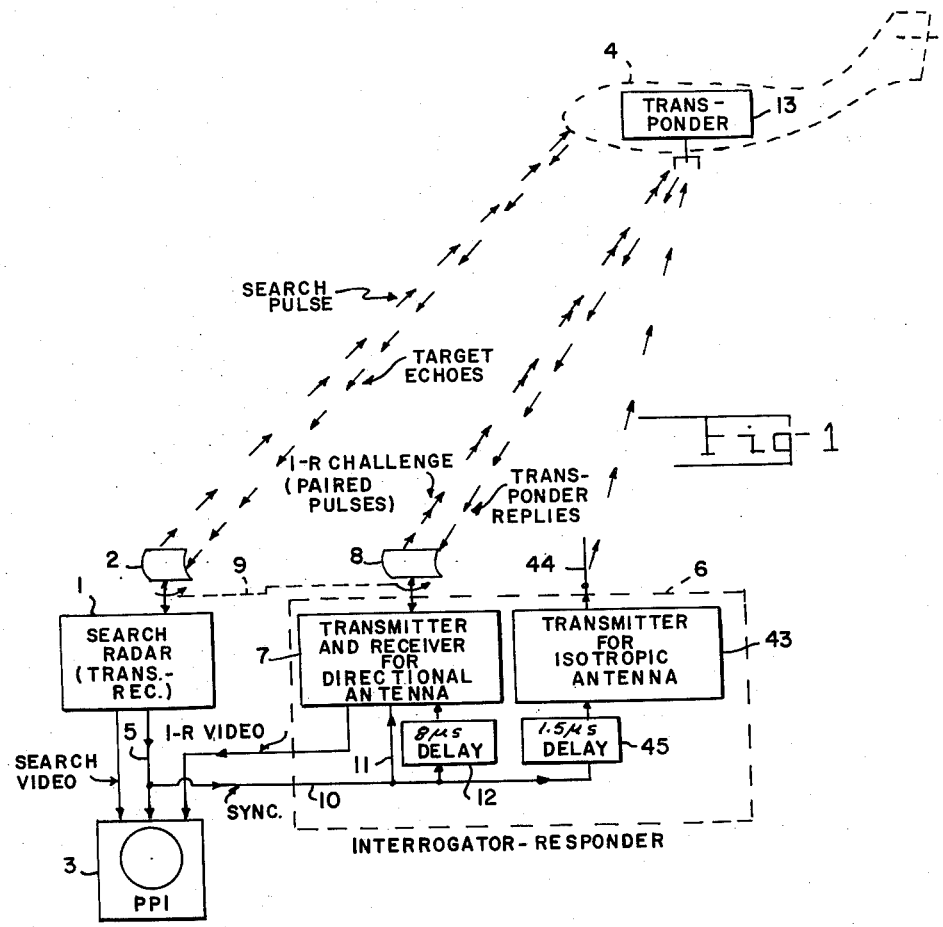
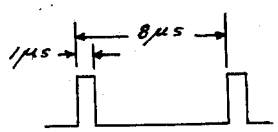
INVENTOR.
MORTON SETRIN
BY
ATTORNEY
AGENT Feb. 25, 1964               M. SETRIN               3,122,737
APPARATUS FOR SUPPRESSING SIDE-LOBE INTERROGATIONS
IN TRANSPONDER BEACON SYSTEMS
Filed May 17, 1960                               4 Sheets-Sheet 2

*INVENTOR.*
MORTON SETRIN
BY
ATTORNEY
AGENT

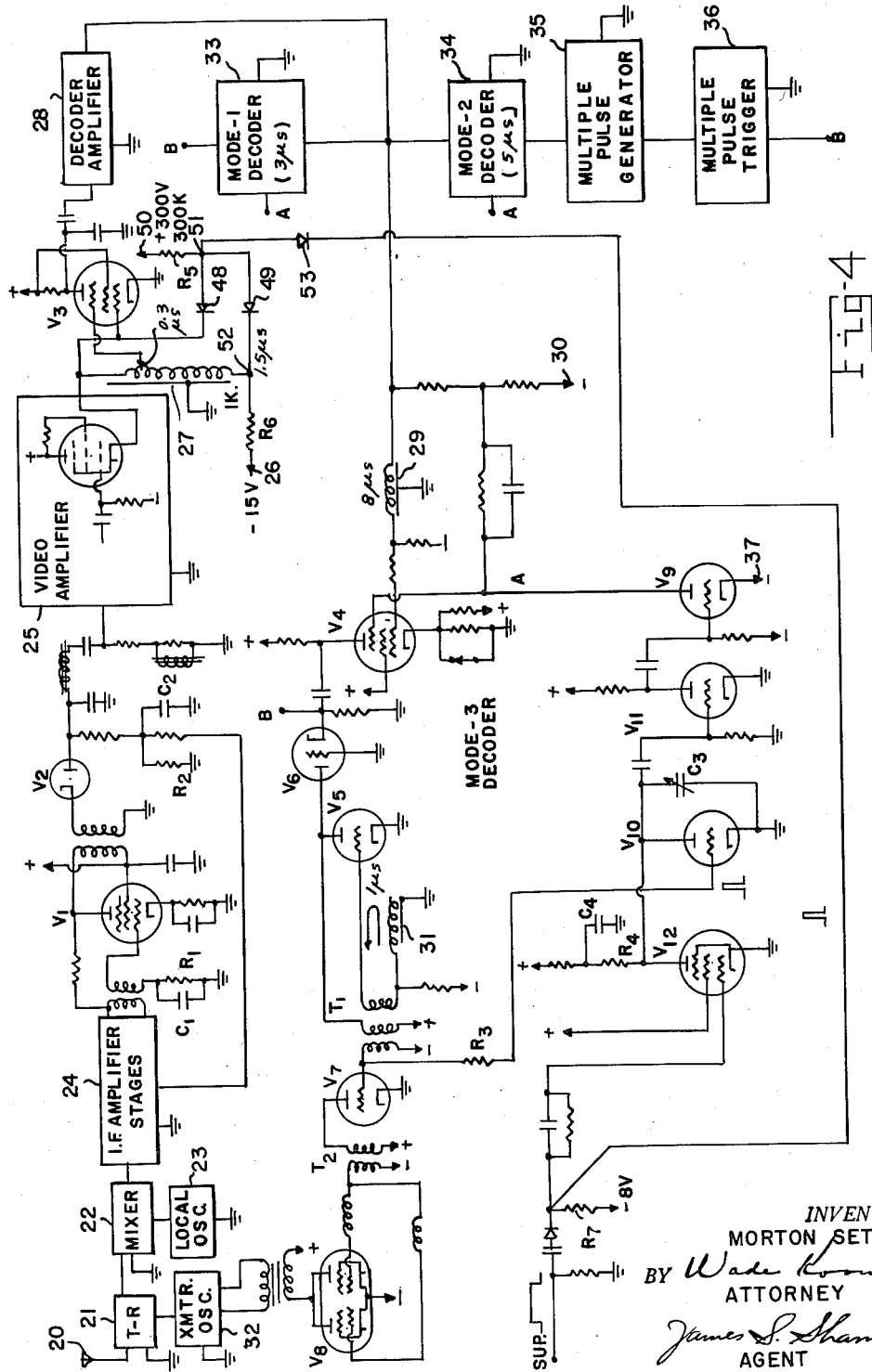

Feb. 25, 1964 M. SETRIN 3,122,737
APPARATUS FOR SUPPRESSING SIDE-LOBE INTERROGATIONS
IN TRANSPONDER BEACON SYSTEMS
Filed May 17, 1960 4 Sheets-Sheet 4

INVENTOR.
MORTON SETRIN
BY
ATTORNEY
AGENT 3,122,737
APPARATUS FOR SUPPRESSING SIDE-LOBE INTERROGATIONS IN TRANSPONDER BEACON SYSTEMS
Morton Setrin, 334 Glen Road N., Rome, N.Y.
Filed May 17, 1960, Ser. No. 29,770
8 Claims. (Cl. 343—6.5)
(Granted under Title 35, U.S. Code (1952), sec. 266)

The invention described herein may be manufactured and used by or for the United States Government for governmental purposes without payment to me of any royalty thereon.

This application is a continuation-in-part of my Application Serial No. 699,427, filed November 27, 1957, now abandoned.

Transponder beacon systems are used in combination with primary radar systems to permit targets equipped to operate in the system to be distinguished from targets not so equipped and further, by the use of codes, to distinguish between equipped targets. Transponder beacons are widely used on aircraft and, in addition to the identification function, are relied on to back up surveillance and air traffic control radars. In such use, they fill in radar blind spots, enhance radar returns and usually extend far beyond the range of primary radars, thereby increasing the effectiveness of the radar systems.

A transponder beacon system consists of an interrogator-responder located at the primary radar transmitter and synchronized therewith, and a transponder located on the target. The interrogator-responder and the transponder each consists of a transmitter and a receiver. The interrogator-responder transmitter directionally radiates an interrogating signal, usually a pair of pulses, which is received by the omnidirectional transponder receiver. The output of the transponder receiver then acts on the transponder transmitter to cause it to radiate a reply signal to the interrogator-responder receiver. This reply signal is displayed on the plan position indicator adjacent the primary radar echo from the same target. Either or both of the interrogating and reply signals may be coded. The beacon system normally operates on a frequency different from that of the primary radar.

A difficulty arises in systems of the above type due to the imperfect directivity of the interrogator-responder antenna. Although the greater portion of the radiated power of a directional antenna is in the direction of its main lobe, there are side lobes extending in all directions and, while the radiations in the directions of the side lobes are of insufficient strength to interrogate a transponder at great range, the close ranges are cluttered with side-lobe responses to the extent that it is extremely difficult if not impossible for an operator to locate the true position of an aircraft. Further, nonsynchronous replies, chiefly caused by side-lobe interrogations of near-by interrogators, drift through all ranges of the radar display and severely hamper the operator's ability to resolve synchronous replies. Nonsynchronous replies also confuse automatic or semiautomatic trackers employing transponder returns and cause them to malfunction.

It is the object of this invention to provide a relatively simple technique for preventing, or at least greatly reducing, side-lobe interrogations and their attendant difficulties. Briefly, this technique comprises providing a second transmitter in the interrogator-responder. The second transmitter feeds an isotropic or omnidirectional antenna and is synchronized with the usual interrogator-responder transmitter to isotropically radiate a pulse of energy occurring shortly after the first pulse of the interrogating pair. The power radiated in any direction by the isotropic antenna is made substantially less than the power radiated in the direction of the main lobe of the directional antenna but preferably equal to or somewhat greater than the power radiated in the direction of the strongest side lobe. Under these circumstances, when the transponder is interrogated by the main lobe the interrogating signal begins with a strong pulse followed closely by a pulse of much less power, but when interrogated by a side lobe the interrogating signal begins with a weaker pulse followed closely by a pulse of substantially equal or greater power. The transponder is equipped with a disabling circuit sensitive to the latter condition.

The invention will be explained in more detail with reference to the specific embodiment thereof shown in the accompanying drawings, in which:

FIG. 1 illustrates, in conjunction with a primary radar, a transponder beacon system employing the invention;

FIG. 2 illustrates the interrogating signal in a conventional beacon system;

FIG. 4 is a schematic diagram of a transponder incorporating the invention;

Figure 3:
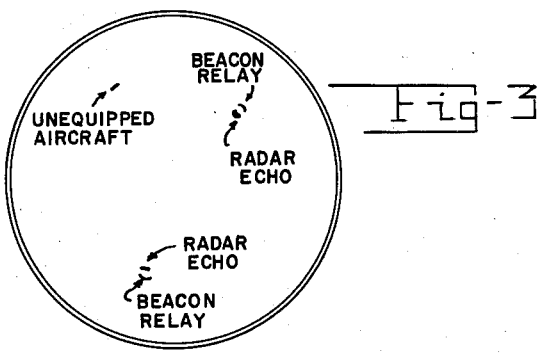
FIG. 3 illustrates the appearance of equipped and unequipped aircraft indications on the plan position indicator of a radar.

A conventional transponder beacon system will first be explained with reference to FIGS. 1–4 after which the modifications necessary to incorporate the invention in the system will be discussed. FIG. 1 illustrates, by way of example, a ground primary radar station and cooperating beacon system. The primary radar comprises block 1, rotating directional antenna 2 and plan position indication or PPI display equipment 3. A transmitter in block 1 applies short pulses of high frequency energy periodically to antenna 2. For example, these pulses may have a duration of 1 microsecond and a repetition rate of 1000 per second. This energy is radiated into space in a narrow scanning beam by the rotating antenna 2. Reflecting targets, such as aircraft 4, cause some of the energy to return to antenna 2 and to be applied to a radar receiver in block 1 which converts the high frequency pulses into video pulses or echoes. These pulses, designated the search video in FIG. 1, are applied to the PPI display 3 which is synchronized with the radiated pulses and antenna direction over synchronizing connection 5 and displays these echoes at an azimuth and range corresponding to those of the target.

Associated with the primary radar is an interrogator-responder 6 which, for the present, will be considered to contain only the transmitter and receiver 7 associated with a second directional antenna 8. The directivity of this antenna coincides with that of antenna 2 and the two antennas are preferably located on the same rotating structure, as indicated by the dotted line 9. Synchronizing pulses from radar 1 are applied over connections 5, 10 and 11 to the transmitter in block 7 causing this transmitter to apply an interrogating signal to antenna 8 each time a pulse is radiated by antenna 2. The interrogating transmitter operates at a radio frequency different from that of the primary radar. The interrogating signal may be coded in various ways. In FIG. 1, as an example, the interrogating signal consists of two 1 microsecond pulses separated by 8 microseconds, as shown in FIG. 2. Such a signal may be generated by applying the synchronizing pulse from the primary radar directly to the interrogating transmitter and also through 8 microsecond delay 12 to the transmitter, which thereby receives two trigger pulses spaced by 8 microseconds. The interrogating pulse pairs are received by the omnidirectional antenna of transponder 13 carried by the aircraft. The transponder contains a receiver, a reply signal generator and a transmitter, as will be described later. If the receiver is conditioned to respond to a pulse pair of 8 microsecond separation, it triggers the reply signal generator causing a reply signal to be applied to the transponder transmitter, which energizes the transponder antenna to radiate the reply signal back to antenna 8 of the interrogator-responder. The receiving portion of block 7 converts the received reply into a video signal, designated the I-R video in FIG. 1, which is applied to the display device 3 along with the primary radar or search video. The appearance of the PPI screen for both equipped and unequipped aircraft is shown in FIG. 3. If the aircraft is equipped with a transponder, the reply signal appears at slightly greater range than the primary radar echo. If the aircraft is unequipped, only the primary radar echo appears. For simplicity, the reply signal is described as a single pulse. Multiple pulse replies are also possible for coding purposes and are obtained by appropriate design of the reply signal generator in the transponder. Also, for coding purposes, interrogating pulse pairs of various time separations may be used.

Details of transponder 13 are shown in FIG. 4. The interrogating signal is received by antenna 20 and applied through transmit-receive network 21 to mixer 22 along with the frequency of local oscillator 23. The resulting intermediate frequency signal is amplified in I.F. amplifier stages 24 and a final I.F. amplifier stage $V_1$. The I.F. output of $V_1$ is detected by diode detector $V_2$ so as to produce a video signal at the input of video amplifier 25. The output of this amplifier for an authentic interrogating signal, in the specific example shown, is a pair of positive 1 microsecond video pulses separated by 8 microseconds (FIG. 2).

Video stage $V_3$ operates as a spike discriminator. Among the various types of undesired signals that may cause a false response from the transponder, one in particular makes it necessary to incorporate the spike discriminating feature of stage $V_3$. This undesired signal consists of very narrow paired pulses with the correct interrogation pair spacing, in this case 8 microseconds, but with a duration of only 0.3 microsecond or less. Such pulses are called "spikes" because of their narrow width. While the spike discriminator must block the main signal channel to these undesired signals, it must also act as a video amplifier for authentic interrogation pulses. This result is accomplished by applying the principle of coincidence mixing. The control and suppressor grids of $V_3$ are connected to a point 26 of sufficiently negative potential that no possible input signal acting on one of the grids only can cause anode conduction. Any signal appearing at the output of video amplifier 25 appears immediately on the control grid of $V_3$ and 0.3 microsecond later on the suppressor grid by virtue of the latter being connected to the 0.3 microsecond point on delay line 27. If this signal does not have a duration greater than 0.3 microsecond, it will not appear on both grids at the same time and no anode condition will occur. A true interrogating signal, however, which has a duration of 1 microsecond, will simultaneously occur on both grids for a period of 0.7 microsecond and will produce a negative output pulse from $V_3$ of like duration. All authentic interrogating signal pulses are therefore passed by the spike discriminator and, while they are somewhat shortened in the process, remain of sufficient length to operate the following decoder.

After further amplification in video decoder amplifier 28, the interrogating signal is applied to decoder stage $V_4$ with positive polarity. The principle of coincidence mixing is also used in the decoder. The interrogating video signal is applied to the suppressor grid of $V_4$ without delay and to the control grid after 8 microseconds delay produced by delay line 29. Both grids are connected to a point 30 sufficiently negative in potential that anode conduction can not be produced in $V_4$ by a signal acting on one of the grids only. Consequently the pulses of an interrogating pair having other than 8 microseconds separation will not appear simultaneously on both grids and anode conduction will not occur. An interrogating pair of 8 microsecond separation, however, will result in positive pulses appearing simultaneously on the suppressor and control grids and a negative pulse at the anode of $V_4$.

The firing of the decoder completes the receiving function of the transponder; at the same time, in the first step of transmitter operation, the decoder output triggers the reply pulse generator. The reply pulse generator is a blocking oscillator comprising stage $V_5$, transformer $T_1$ and open end 1 microsecond timing line 31. The negative pulse output of decoder $V_4$ is applied to the cathode of grounded grid trigger tube $V_6$ causing a negative pulse at its anode which is applied to the anode of $V_5$ and the primary of $T_1$, the secondary of $T_1$ connected to the grid of $V_5$ being poled so that this pulse drives the grid in a positive direction. This triggers the blocking oscillator causing it to generate a 1 microsecond pulse which is applied through the remaining secondary winding of $T_1$ to the grid of modulator driver stage $V_7$. The output of $V_7$ is coupled to modulator stage $V_8$ by transformer $T_2$. The 1 microsecond pulse output of modulator $V_8$ keys transmitter oscillator 32 causing it to produce a 1 microsecond pulse of high frequency energy which is applied through T–R network 21 to antenna 20. The oscillator preferably operates on a frequency slightly different from that of the interrogator-responder transmitter to which the transponder receiver is tuned.

A transponder of the above type may be designed to operate in more than the one mode described above, to which the details have been restricted for simplicity. For example, the transponder may also respond to interrogating pulse pairs of 3 microseconds separation for which a Mode 1 decoder 33, (FIG. 4) would be provided, and also to pulse pairs of 5 microseconds separation for which a Mode 2 decoder 34 would be provided. The operation of these decoders is identical to the operation, designated Mode 3, of the decoder $V_4$. Further, as in the illustrated case of Mode 2, the reply signal may contain more than one pulse. In this case, the decoder triggers a multiple pulse generator 35 which, in turn, energizes blocking oscillator trigger tube $V_6$ through multiple pulse trigger 36.

Authentic interrogations which normally reach the transponder by a direct path from the interrogator-responder may also reach the transponder by a path involving one or more reflections and arrive at a later time than the direct path signal because of the greater distance travelled. The time displacement might be such that the first pulse of the reflected interrogation pulse pair could combine with the first pulse of the direct path signal to form a spurious interrogation that would trigger the transponder in the wrong mode of operation. The transponder of FIG. 4 incorporates echo suppression circuits to minimize this possibility. For time displacements greater than those covered by the echo suppression circuits, a recovery delay circuit operates. This circuit disables the transponder for a period of approximately 100 microseconds after it has replied to an authentic pulse pair so that it is prevented from replying to any echo signal (or any other signal) during this period.

Echo suppression is provided by two short time constant gain reducing circuits incorporated in I.F. stage $V_1$ and detector stage $V_2$. The former is more effective with strong signals and the latter with weak signals. Following each strong pulse received at the grid of $V_1$ the sensitivity of this stage is reduced for approximately 5 microseconds due to the charging of $C_1$ by the grid leak bias voltage developed across $R_1$. The reduction in sensitivity tends to suppress a closely following echo, which is of considerably less amplitude than the direct path signal, without seriously attenuating the strong second pulse of an interrogating pair. In addition, in the output circuit of diode detector $V_2$, the capacitor $C_2$ is charged by each negative voltage pulse from the plate of $V_2$. This action biases the detector sufficiently to prevent the detection of a closely following weaker pulse. The time constant $R_2$, $C_2$ of this circuit is only about one microsecond, short enough to permit substantial detector recovery before the arrival of the second pulse of an interrogating pair.

The recovery delay circuit suppresses all reply generation in the transponder for a brief fixed interval (about 100 microseconds) following the transmission of each reply pulse or pulse group. This circuit therefore serves to suppress replies to echoes, as well as other signals, occurring shortly after a completed interrogation. Recovery delay is obtained by means of a control voltage supplied to the suppressor grid decoder tube $V_4$ and the suppressor grids of the decoders for other modes which are tied to the anode of suppressor tube $V_9$. When $V_9$ conducts the suppressor grids of the decoders are made sufficiently negative to prevent the decoders from being triggered. The suppressor tube itself is controlled by an amplification and integration circuit which is fed by the output winding of the reply pulse blocking oscillator transformer $T_1$. A positive reply pulse applied through current limiting resistor $R_3$ to the grid of recovery delay amplifier $V_{10}$ causes the trimming capacitor $C_3$ to rapidly discharge with a sharp fall in the anode potential of $V_{10}$. The negative pulse at the anode of $V_{10}$ cuts off suppression amplifier $V_{11}$ producing a positive output that enables suppressor tube $V_9$ to conduct lowering the decoder suppressor grids to substantially the potential of point 37. This potential is made low enough to prevent triggering of the decoders. The suppression duration is determined by the time required for $C_3$ to recharge through the comparatively long time constant circuit of $R_4$ and $C_4$. As soon as $V_{11}$ is again enabled to conduct $V_9$ is cut off and the potential on the suppressor grids of the decoders returns to its normal value. Provision is also made for external suppression by the application of a positive suppression pulse to terminal SUP. In this case, tube $V_{12}$ is rendered conductive and this tube rather than $V_{10}$ discharges $C_3$, the operation otherwise being the same. External suppression is usually for a longer period, the period equalling the duration of the externally applied pulse added to the normal recovery time of the circuit.

Figure 5:
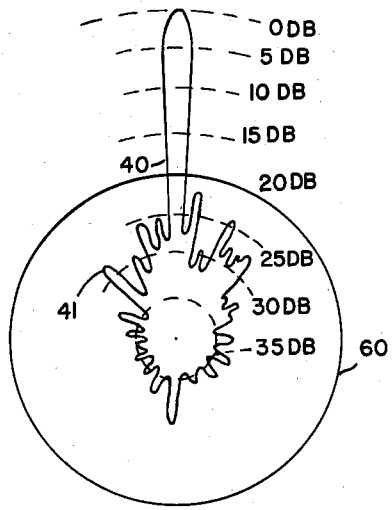
FIG. 5 illustrates the directivity pattern of a typical directional antenna.

The foregoing describes a transponder beacon system of the prior art. The radiation pattern of antenna 8 of the interrogator-responder (FIG. 1) may be as shown in FIG. 5. In this figure, 40 represents the main lobe and the preponderance of radiated energy is in the direction of this lobe. However, energy is unavoidably radiated in lesser amounts in other directions as indicated by the side lobes 41. When an aircraft is at great range, only the main lobe energy is of sufficient magnitude to elicit a response from the transponder, but at close range the transponder may respond to both main and side lobe interrogations and thereby give a confused picture of the aircraft location in space.

In order to prevent side-lobe interrogations, the interrogator-responder 6 of FIG. 1, in accordance with the invention, is equipped with a second transmitter 43 operating at the same frequency as transmitter 7 and feeding an isotropic or omnidirectional antenna 44. Transmitter 43 is synchronized with transmitter 7 and produces a 1 microsecond pulse shortly after the first pulse of the interrogation pair produced by this transmitter. This pulse must lie within the effective echo suppression range (5 microseconds) of stages $V_1$ and $V_2$ (FIG. 4) and must also occur before the second pulse of the interrogating pair. Since the minimum pulse pair separation (Mode 1) in the specific apparatus described is 3 microseconds, the isotropic pulse may be placed in time midway between the Mode 1 pair or at 1.5 microseconds separation from the first pulse of the interrogating pair. The positioning of this pulse is effected by delay element 45. The resulting hybrid interrogating signals, for both main and side lobe interrogations, appear as in FIG. 6.

Figure 6:
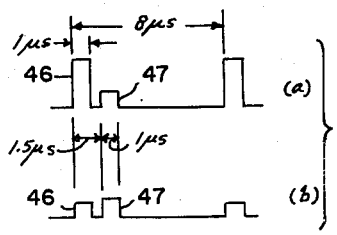
FIG. 6 illustrates the interrogating signals for both main and side-lobe interrogations in a system employing the invention.

The power radiated by antenna 44 in any direction must be substantially less than the power radiated in the direction of the main lobe of antenna 8 and preferably equal to or slightly greater than the power radiated by the strongest side lobe of the antenna. In FIG. 5, 60 represents the horizontal pattern of the isotropic antenna 44. This antenna should be designed to have a vertical pattern that matches the vertical pattern of directional antenna 8 as closely as possible. In the example shown, omnidirectional power is 20 db below the peak main lobe power of the directional antenna and about 2 db above the maximum power radiated in the strongest side lobe. Under these conditions the main lobe hybrid interrogation of the transponder, for Mode 3 operation, appears as at (a) in FIG. 6, pulse 46 representing the first pulse of the interrogating pair and pulse 47 representing the signal due to isotropic antenna 44. As illustrated, the magnitude of the pulses in the interrogating pair substantially exceeds the magnitude of the isotropic pulse. For side lobe interrogation, however, the magnitude of the interrogating pulse is at most only equal to and is usually less than the magnitude of the isotropic pulse due to the reduced power radiated by the side lobes of antenna 8, as illustrated in FIG. 6 at (b). The transponder responds normally to the signal at (a), the pulse 47 being removed by the echo suppression circuits which act as a pulse power discriminator. In accordance with the invention, the transponder is provided with a circuit to sense and suppress a reply to a signal of the type shown at (b).

The operation of the transponder in response to hybrid interrogating signals of the type shown in FIG. 6 will now be considered in more detail. When the transponder receives a main lobe interrogation, the signal, as already stated, is as shown at (a) in FIG. 6. Here, the power of the first pulse 46 well exceeds that of the closely following isotropic pulse 47. Therefore, the transponder simply treats pulse 47 as an echo of pulse 46 and eliminates pulse 47 through operation of the echo suppressing features of stages $V_1$ and $V_2$. In other words, the strong pulse 46 produces bias voltages across $C_1$ and $C_2$ which render stages $V_1$ and $V_2$ insensitive to the weaker pulse 47 and prevent its passage. Passage of the stronger second pulse of the interrogating pair is not prevented and a normal interrogating pair is applied to video amplifier 25 so that operation of the transponder is unchanged by the presence of isotropic pulse 47 in main lobe interrogations.

For a side-lobe interrogation, however, the hybrid interrogating signal reaching the transponder is as shown at (b) in FIG. 6. In this case, first pulse 46 normally never exceeds and is usually less in magnitude than isotropic pulse 47 and, as a result, is unable to desensitize stages $V_1$ and $V_2$ to this pulse. Therefore, the signal appearing at the output of video amplifier 25 contains isotropic pulse 47 and is as shown at (b) in FIG. 6. The circuit for sensing this side lobe signal is incorporated in spike suppressor stage $V_3$ and comprises 1.5 microsecond delay line 27, the 0.3 microsecond tap of which is used in the spike suppressor circuit as already explained, and diodes 48, 49 and 53.

The cathode current of the output cathode follower stage of video amplifier 25 flows through line 27 and $R_6$ to $-15$ v. point 26. Also, an additional current of about 1 milliampere flows from $+300$ v. point 50 through $R_5$ to point 51 where it divides, part flowing through diode 48 and line 27 to point 52 and the remainder flowing through diode 49 to point 52. The two parts recombine at point 52 and flow through $R_6$ with the cathode follower current to point 26. The division of currents at point 51 is not necessarily equal, but is determined by the resistance of line 27 and the low level forward characteristics of the diodes. Under static conditions, the voltage drop across $R_6$ is about 3 v. so that the static potential at point 52 is about −12 v. and is held substantially constant by the negative feedback inherent in the cathode follower stage. Consequently, under static conditions, point 51 clamps to a potential of about −12 v. and diode 53 is cut off since its cathode is connected through $R_7$ to a point of −8 v. potential.

Considering the operation of the side lobe sensing circuit, the cathodes of diodes 48 and 49 constitute, in effect, the input terminals of a two-input AND gate, the output terminal of which may be point 51. As is characteristic of an AND gate, simultaneous input pulses on both input terminals are required to produce a pulse at the output terminal. An input pulse on only one of the input terminals will not produce an output pulse since point 51 remains clamped to approximately the potential of point 52 (about −12 v.) by the other diode.

In the presence of a side-lobe interrogation, the signal at the output of video amplifier 25 contains first and second positive pulses of comparable amplitudes and 1.5 microsecond separation, as seen at (b) in FIG. 6. It is apparent that in this case the first two pulses, 46 and 47, will appear simultaneously on the cathodes of diodes 48 and 49 raising the potentials of these cathodes and causing a similar rise in potential of point 51. If the increase is sufficient to drive the anode of diode 53 above its cathode potential, a positive pulse is applied to the grid of $V_{12}$ which conducts and discharges $C_3$ resulting in a 100 microsecond disabling of the mode decoders, in a manner already explained, and preventing the generation of a reply to the side-lobe interrogation system.

It is therefore seen that the above described side-lobe interrogation sensing circuit and the reply suppression circuit comprising $V_{12}$, $V_{10}$, $C_3$, $V_{11}$ and $V_9$ constitute a means that operates in response to a side-lobe interrogation to disable the transponder reply means. It is further seen that the sensing of a side-lobe interrogation is based upon the presence in the video signal of an omni or "killer" pulse having a predetermined separation, 1.5 microseconds in the example given, from the first pulse of the interrogating pulse pair. As already explained, the "killer" pulse, radiated by the omnidirectional antenna, is present in the video signal resulting from a side-lobe interrogation because the power ratio of the omni pulse to the interrogating pulse radiated by the directional antenna is too great in the case of side lobes for the omni pulse to be eliminated by the echo suppression circuits of the receiver.

Figure 7:
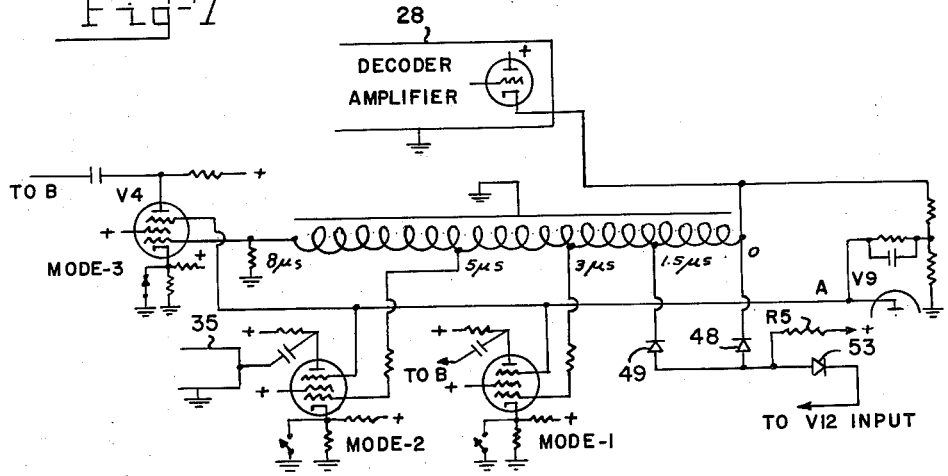
FIG. 7 shows an alternative design for the decoding portion of FIG. 4.

The addition of the side-lobe sensing circuit to the $V_3$ stage in no way interferes with the spike discriminating function of this stage. However, it is not necessary that the sensing circuit be inserted at this point. FIG. 7 shows an alternative arrangement in which a single 8 microsecond delay line serves the three mode decoders and also the side-lobe sensing circuit. The diodes 48 and 49 of the side-lobe circuit are connected to the 0 and 1.5 microsecond delay points, respectively, of the line, while the vacuum tube coincidence gates of the three mode decoders have their suppressor grids connected to a point of zero delay and their control grids connected to points of 3, 5 and 8 microsecond delays. The operation is the same as in FIG. 4.

Figure 8:
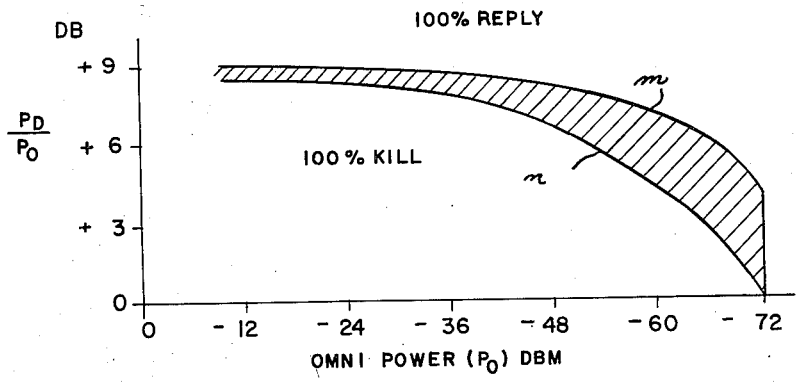
FIG. 8 is a diagram illustrating the response of the system to interrogating signals on the basis of signal strength.

The graph in FIG. 8 illustrates the overall response of a particular transponder to interrogating signals. Transponders of different design parameters will have characteristics differing more or less from the characteristic shown in FIG. 8. The omnidirectional antenna signal power at the transponder receiver, $P_O$, is represented along the horizontal axis while the ratio of the directional antenna power at the receiver, $P_D$, to $P_O$ is represented along the vertical axis. The curve $m$ represents the minimum $P_D/P_O$ that will ensure a reply from the transponder. It is seen from this curve that the power advantage of the directional signal over the omnidirectional signal necessary to ensure a reply decreases from a value of about 9 db for strong signals received at close range to about 4 db at the decoding threshold, −72 dbm., at maximum range. Curve $n$ represent the maximum $P_D/P_O$ that will ensure disabling or a kill of the transponder reply function. The cross hatched area between curves $m$ and $n$ represents an area of uncertainty in which an interrogation may result in a reply or a kill. This area of uncertainty is due to noise and, as would be expected, the divergence of the curves increases with decreasing signal level due to the increased importance of noise at the lower signal levels.

Considering FIG. 8 further, any interrogation for which $P_D/P_O$ falls above curve $m$ ensures a reply and any interrogation for which $P_D/P_O$ falls below curve $n$ ensures a kill, i.e. a disabling of the reply function. It is therefore desirable that the omnidirectional power be so related to the directional power that all main lobe interrogations fall above curve $m$ and all minor lobe interrogations fall below curve $n$. For a particular equipment having the characteristic of FIG. 8, it is seen that, allowing a slight margin of safety, a 10 db advantage of the directional power over the omni power will be sufficient to prevent main lobe killing at close ranges and will therefore ensure replies over the entire operating range. This 10 db advantage should be with respect to the half-power points so that replies will be obtained through the full beamwidth. Therefore the omnidirectional power should not exceed a level 13 db below the peak main lobe power. In the example given in FIG. 5, it is seen that the omni power is some 17 db below the half-power points of the main lobe. With regard to the minimum limit of the omni power, it is seen in FIG. 8 that the omni power level must not be less than the maximum minor lobe power to ensure a 100% kill of the reply function at the decoding threshold (maximum range) and therefore 100% kill throughout the operating range. Therefore, allowing some margin of safety, the minimum level of the omni power should be 2 or 3 db above the peak of the strongest minor lobe.

In well designed directional antennas, the above defined maximum and minimum omni power limits will be separated by at least several decibels; however, in a poorly designed antenna having a strong minor lobe the limits may overlap. In the latter case, it is usually more desirable to observe the maximum limit of the omni power rather than the minimum limit since it is usually better to permit some side lobe replies at the greater ranges than to kill the main lobe replies at close ranges. There are therefore circumstances under which it may be desirable that the omni power be somewhat less than that of the strongest minor lobe.

The characteristic of FIG. 8 is capable of considerable variation through variations in the design of the echo suppression circuits of the transponder receiver and, therefore, the configuration given in FIG. 8 should be taken as only one of a number of possible characteristics. Also the values and other parameters given in the specification and drawings are to be considered only as examples of specific designs and may be varied as required to meet specific design requirements without departing from the scope of the invention.

I claim:

1. A transponder beacon system comprising an interrogator-responder and a transponder, said interrogator-responder comprising means for repeatedly radiating a hybrid interrogating signal comprising an interrogating pulse and a closely following isotropic pulse, said interrogating pulse being radiated by a directional scanning antenna having a pattern with a main lobe and side lobes of lesser power than the main lobe and said isotropic pulse being radiated in an isotropic pattern in which the power radiated in any direction is substantially less than the power radiated by the scanning antenna in the direction of the main lobe but not less than the power radiated by the scanning antenna in the direction of the strongest side lobe, said transponder comprising a radio receiver for receiving said hybrid interrogating signal, said receiver containing a pulse power discriminator operative whenever the received interrogating pulse power exceeds the received isotropic pulse power by a predetermined amount to bar said isotropic pulse from the receiver output, reply means coupled to the receiver output and responsive to the receiver output signal for generating and radiating a reply signal to said interrogator-responder, and means coupled to the receiver output and selectively responsive to a pair of successively occurring pulses having the time spacing of said interrogating and isotropic pulses for disabling said reply means.

2. A transponder beacon system comprising an interrogator-responder and a transponder, said interrogator-responder comprising means for repeatedly radiating a hybrid interrogating signal comprising an interrogating pulse and a closely following isotropic pulse, said interrogating pulse being radiated by a directional scanning antenna having a pattern with a main lobe and side lobes of lesser power than the main lobe and said isotropic pulse being radiated in an isotropic pattern in which the power radiated in any direction is substantially less than the power radiated by the scanning antenna in the direction of the main lobe but not appreciably less than the power radiated by the scanning antenna in the direction of the strongest side lobe, said transponder comprising a radio receiver for receiving said hybrid interrogating signal, said receiver containing a pulse power discriminator operative whenever the received interrogating pulse power exceeds the received isotropic pulse power by a predetermined amount to bar said isotropic pulse from the receiver output, reply means coupled to the receiver output and responsive to the receiver output signal for generating and radiating a reply signal to said interrogator-responder, and means coupled to the receiver output and selectively responsive to a pair of successively occurring pulses having the time spacing of said interrogating and isotropic pulses for disabling said reply means.

3. A transponder for replying to interrogating signals in the form of short duration serial pulses of radio frequency energy, comprising: a radio receiver having an input circuit for receiving said signals and an output circuit, said receiver having means operative for a short interval after the receipt of a relatively strong signal pulse to desensitize the receiver to a following pulse occurring within said interval and of appreciably less power than the first occurring pulse; reply means coupled to the output of said receiver and responsive to the receiver output signal for generating and radiating a reply signal; and means also coupled to the output of said receiver and selectively responsive to a pair of receiver output pulses having a predetermined fixed time spacing less than said interval for disabling said reply means.

4. A transponder for replying to interrogating signals in the form of short duration serial pulses of radio frequency energy, comprising: a radio receiver having an input circuit for receiving said signals and an output circuit, said receiver having an echo suppression circuit operative for a short interval after the receipt of a relatively strong signal pulse to desensitize the receiver to a following pulse occurring within said interval and of appreciably less power than the first occurring pulse; reply means coupled to the output of said receiver and responsive to the receiver output signal for generating and radiating a reply signal; and means also coupled to the output of said receiver and selectively responsive to a pair of receiver output pulses having a predetermined fixed time spacing less than said echo suppression interval for disabling said reply means.

5. Apparatus as claimed in claim 4 in which said receiver contains a video amplifier the output circuit of which constitutes the output circuit of said receiver and in which said echo suppression circuit is situated in said receiver between the receiver input and the input to said video amplifier.

6. A transponder for replying to interrogating signals in the form of short duration serial pulses of radio frequency energy, each interrogating signal containing a first pulse followed after a short interval by a second pulse with the power ratio of the first pulse to the second pulse subject to variation, said transponder comprising: a radio receiver having an input circuit for receiving said signals and an output circuit, said receiver containing a pulse power discriminator operative whenever said power ratio has a relatively high value to pass said first pulse to the receiver output but to prevent said second pulse from reaching the receiver output, and operative whenever said power ratio has a relatively low value to pass both said first and said second pulses to the receiver output; reply means coupled to the output of said receiver and responsive to the receiver output signal for generating and radiating a reply signal; and means also coupled to the output of said receiver and selectively responsive to a pair of receiver output pulses having the same time spacing as said first and second pulses for disabling said reply means.

7. A transponder for replying to hybrid interrogating signals in the form of short duration serial pulses of radio frequency energy, each hybrid interrogating signal being composed of first and third pulses having a fixed predetermined time separation and a second pulse occurring between said first and third pulses and separated from said first pulse by a short fixed predetermined time interval, said first and third pulses being radiated by a directional antenna having a main lobe and lesser side lobes and said second pulse being isotropically radiated by an omnidirectional antenna, the power radiated in any direction by the omnidirectional antenna lying between a value substantially equal to the power radiated in the direction of the strongest side lobes of the directional antenna and a value somewhat greater than this value but much less than the power radiated in the direction of the main lobe of the directional antenna, said transponder comprising: a radio receiver having an input circuit for receiving said hybrid interrogating signals and an output circuit, said receiver containing a pulse power discriminator effective only for a short interval after the receipt of a pulse, said discriminator being operative whenever the ratio of the said first pulse power to the said second pulse power has the relatively high value corresponding to a main lobe interrogation of the transponder to pass said first and third pulses to the receiver output but to prevent said second pulse from reaching the receiver output, and being operative whenever the ratio of the said first pulse power to the said second pulse power has the relatively low value corresponding to a side lobe interrogation of the transponder to pass said first, second and third pulses to the receiver output; reply means coupled to the receiver output and selectively responsive to a pair of receiver output pulses having the same time separation as said first and third pulses for generating and radiating a reply signal; and means also coupled to the receiver output and selectively responsive to a pair of receiver output pulses having the same time spacing as said first and second pulses for disabling said reply means.

8. A transponder beacon system comprising an interrogator-responder and a transponder, said interrogator-responder comprising means for repeatedly radiating a hybrid interrogating signal composed of first and third pulses having a fixed predetermined time separation and a second pulse occurring between said first and third pulses and separated from said first pulse by a short fixed predetermined time interval, said first and third pulses being radiated by a directional antenna having a main lobe and lesser side lobes and said second pulse being isotropically radiated by an omnidirectional antenna, the power radiated in any direction by the omnidirectional antenna lying between a value substantially equal to the power radiated in the direction of the strongest side lobes of the directional antenna and a value somewhat greater than this value but much less than the power radiated in the direction of the main lobe of the directional antenna; said transponder comprising a radio receiver having an input circuit for receiving said hybrid interrogating signals and an output circuit, said receiver containing a pulse power discriminator effective only for a short interval after the receipt of a pulse, said discriminator being operative whenever the ratio of the said first pulse power to the said second pulse power has the relatively high value corresponding to a main lobe interrogation of the transponder to pass said first and third pulses to the receiver output but to prevent said second pulse from reaching the receiver output, and being operative whenever the ratio of the said first pulse power to the said second pulse power has the relatively low value corresponding to a side lobe interrogation of the transponder to pass said first, second and third pulses to the receiver output, reply means coupled to the receiver output and selectively responsive to a pair of receiver output pulses having the same time separation as said first and third pulses for generating and radiating a reply signal, and means also coupled to the receiver output and selectively responsive to a pair of receiver output pulses having the same time spacing as said first and second pulses for disabling said reply means.

References Cited in the file of this patent
UNITED STATES PATENTS
2,824,301   Levell _____ Feb. 18, 1958